United States Patent Office 3,550,993
Patented Dec. 29, 1970

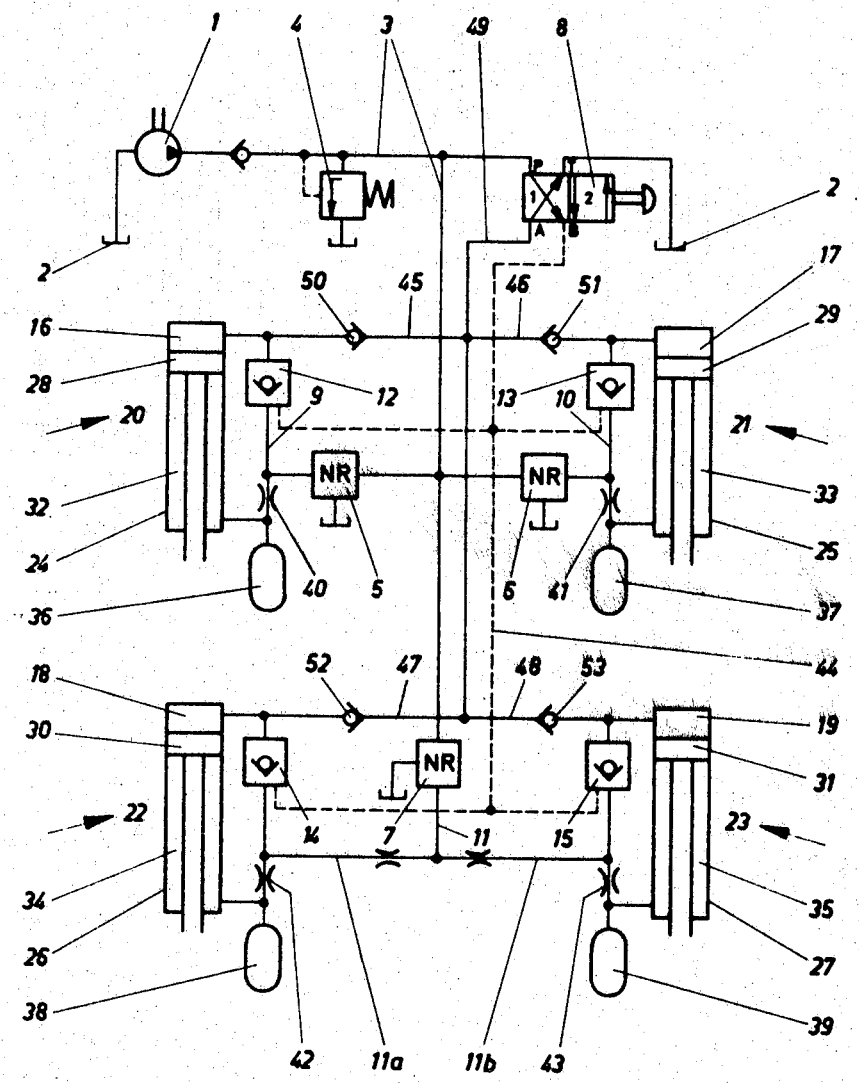

3,550,993
LEVEL REGULATED HYDRO-PNEUMATIC SPRING SUSPENSION SYSTEM FOR VEHICLES
Joachim Peiffer, Oberkassel, Dusseldorf, Germany, assignor to Langen & Co., Dusseldorf, Germany
Filed Oct. 22, 1968, Ser. No. 769,646
Claims priority, application Germany, Dec. 21, 1967, 1,630,758
Int. Cl. B60g 23/00
U.S. Cl. 280—6                                                      1 Claim

ABSTRACT OF THE DISCLOSURE

A level regulated hydro-pneumatic spring suspension system for vehicles which is provided with an operating cylinder arranged between the supporting means for each wheel and the chassis with the operating cylinder including a cylinder and a piston with the piston dividing the cylinder into a space above the piston and an annular space below the piston with the spaces of the cylinder being connectable with the pressure line or the discharge via pilot controlled check valves and level regulating valves in dependence on the mean height of the vehicle body above the wheel supporting means.

BACKGROUND OF INVENTION

The present invention relates to a level regulated hydro-pneumatic spring suspension system for vehicles.

Spring suspension systems of the above referred or similar types have heretofore been employed primarily for use in passenger vehicles. However, since such suspension systems are now also being used for commercial vehicles, measures must be provided for certain applications in order to insure the desired operation of the vehicle. For example, in the case of truck cranes or hoists, there is a danger that the vehicle will be tilted or canted with an unequal load since the highest loaded operating cylinders will retract the farthest. If the additional load increases the total weight of the vehicle substantially such as by two or three times, the pump for the vehicle must produce at least this pressure. In order to accomplish this end, more expensive pump constructions must be selected under certain circumstances. In connection with vehicles provided with compound spring systems, with only one level regulating valve per axle which is connected with a line connecting the piston space of the operating cylinder associated with the axle, such measure would be insufficient in view of the fact that an overflow would take place from the piston space with the higher load to the piston space with the lower load without actuating the level regulating valve.

SUMMARY OF INVENTION

The solutions of the problems in accordance with the suspension system which, if necessary, can be disconnected and which permits a power transmission to be considered as rigid even at increased loads, from the wheel supporting means to the vehicle body.

The solutions of the problems in accordance with the invention are accomplished by means of the following combination:

A level regulated hydro-pneumatic spring system for vehicles provided with hydraulic operating cylinders arranged between the wheel supporting means and the chassis with each cylinder including a cylinder and a piston movable therein with the piston providing a space above the piston and an annular space below the piston with such spaces capable of being connected over pilot controlled check valves and level regulating valves in dependence upon the mean height of the truck body above the wheel supporting means with the pressure line or with the discharge in which the annular spaces of the cylinders are connected with hydro-pneumatic pressure reservoirs and with lines between the pilot controlled check valves and the level regulating valves, the control lines to the pilot controlled check valves and additional lines leading to the spaces above the piston having arranged therein relief valves which open in the direction of the spaces above the piston and lead to a multi-way valve which in a first switching position connects the control lines with the pressure lines and the additional lines leading to the space above the pistons with the discharge and in a second switching position connects the control lines with the discharge and the additional lines leading to the spaces above the pistons with the pressure line.

By means of the multi-way valve, it is possible to eliminate the opening of the pilot controlled check valves and at the same time by-passing such relief valves in order to connect the piston spaces with the pressure line. The pistons extend to a stop with the annular spaces of the cylinders being connected via the level regulating valves with the discharge. This results in the entire piston surface being an effective surface and a substantially higher load can be absorbed without increasing the pressure in the system. With further increasing load which develops a higher pressure than the maximum pump pressure in the piston spaces, the relief valves seal the piston chambers tightly so that the fluid contained therein serves as a substantially rigid transmission medium. Preferably, the hydro-pneumatic pressure reservoirs are only in communication with the annular spaces of the cylinders so that the retraction of the cylinders due to the increased load is avoided.

Further objects and advantages of the invention will become more readily apparent to persons skilled in the art from the following detailed description and annexed drawing in which the sole figure is a diagrammatic view of the fluid circuitry.

As shown in the drawing, operating cylinders 20, 21, 22 and 23 are arranged between the wheel supporting means and the vehicle chassis (not illustrated). Each of the above operating cylinders comprises a cylinder 24, a piston 28 and a piston rod 29. Between the head of the piston 28 and the end of the cylinder there is provided a piston space 16 and between the lower face of the piston and the opposite end of the cylinder an annular space 32. The annular space 32 of each cylinder communicates with a hydro-pneumatic reservoir 36 via a line or conduit 41. A line 45 extends between the piston spaces 16 for respective pairs of operating cylinders 20. A line 9 is provided between each reservoir 36 and each line 45 and a throttle element 40 together with a pilot controlled check valve 12 are installed in the line 9.

A pump 1 driven by a motor (not illustrated) receives liquid from a tank 2 and delivers the liquid to a pressure line 3. A branch line 46 is connected to the pressure line 3 and to the lines 9 for the operating cylinders 20 and 21. A level regulating valve 5 for each of the cylinders 20 and 21 is located in the line 46 and a further branch line 47 connects the pressure line 3 with the lines 9 for the operating cylinders 22 and 23. A level regulating valve 7 is located in the pressure line 3 upstream of the connection between the pressure line and the branch line 47. Relief valves 50 are installed in the line 45 and it will be noted that each of the branch valves 50 open in the direction of the piston chambers 16.

A pressure limiting valve 4 is operably connected to the pressure line 3 together with a multi-way valve 8. It will be noted that the multi-way valve 8 is provided with ports A, B, P and T and the port P is connected to the pressure line 3. The port A is connected to a line 49 which also is connected to the lines 45 leading to the piston spaces 16. The port B is connected by a control line 44 with each of the check valves 12 and the port T leads to tank 2.

In a first switching position of the valve 8, the port P is connected with the port B so that the flow is through line 3, valve 8 and control line 44 for the check valves 12. In this particular position the port T is connected with the port A which in turn is connected via line 49 to the lines 45. In a second switching position of the valve 8, the port P is connected with the port A and the port B with discharge port T.

The method of operation of the present spring suspension system will be described with respect to but one operating cylinder but needless to say, such operation is applicable to all of the cylinders.

In the normal operation of the vehicle, the multi-way valve 8 is in the switching position 1 so that the port P is connected with the port B and the valve 12 is opened over the control line 44. This opening is maintained with sufficient pressure until the valve 8 is activated. The valve 12 thus remains open for both directions of flow and this is necessary since, during the retraction of the piston 28, liquid from space 16 must be displaced partly into the annular space 32 and partly into the reservoir 36 with the throttle element 40 functioning as a damper. During the extension, the liquid is displaced in the opposite direction from the annular space 32 and pressure reservoir 36 into the piston space 16. As is known, the level regulating valve 5 is rather ineffective with rapid extensions and retractions by damping media or not effective at all. On the other hand, statically acting load changes are so balanced by the level regulating valve 5 that the height of the truck body above the wheel supporting means remains constant. In this situation, it is assumed that the cylinder 24 is secured on the truck body and the piston rod 29 to the wheel supporting means and with the level regulating valve 5 responding to the distance variations between the wheel supporting means and the truck body.

For achieving a rigid transmission between the wheel supporting means and the truck body when the vehicle is stationary, it is sufficient to merely disconnect the pump 1. The pressure line 3 thus is relieved of pressure and the pressure in the piston space 16 closes the check valve 12 as well as the relief valve 50 in the branch line 45. The rigid transmission would only function unilaterally since it prevents further retraction of the piston 28. However, if the piston 28 is alternately loaded and relieved or unloaded, the liquid is displaced from the annular space 32 and reservoir 36 into the piston space 16. In view of the fact that a return from the piston space 16 is not possible, a build-up occurs, thereby resulting in a tilting or canting of the vehicle. Such a situation is conceivable, for example, in connection with a boom shovel which is always loaded at its front operating cylinders but is sometimes relieved at the rear by the lever actions exerted by the shovel. This can be avoided by switching the multi-way valve 8 into the switching position 2. In this particular switching position, the control line 44 is connected via ports B and T with the tank 2 and thus the line is free of pressure. The piston space 16 is connected with the pressure line 3 by way of the line 45, the relief valve 50, line 49 and the ports A and P. The piston 28 is thus extended and the annular space 32 is connected via the level regulating valve 5 with the discharge. The piston 28 preferably strikes against a mechanical stop and the blocking of the piston 28 in this direction is accomplished. A slight elevation of the center of gravity of the vehicle can be accepted in operation whereas during driving or moving along a road a lower center of gravity is desirable. By virtue of the relief of the annular space 32, the entire piston surface is available as an effective surface thereby facilitating the absorption of considerable additional loads which should be applied only after the extension of the piston 28 and which then can exceed the load corresponding to the maximum pump pressure. The lowering into the normal position is effected by switching the multi-way valve 8 into the position 1 with the pump 1 in operation.

It should be pointed out that the invention is not to be restricted to the diagrammatic showing in the drawing, but any number of operating cylinders can be used. Similiarly, the number of the level regulating valves can vary and the actuation of the multi-way valve can be accomplished mechanically, pneumatically, hydraulically, or any other convenient manner from the driver's cab.

What I claim is:

1. In a level regulated hydro-pneumatic spring suspension system for vehicles of the type having a fluid motor arranged between each wheel supporting means and a vehicle chassis, with each fluid motor including a cylinder and a piston dividing the cylinder into a piston space and an annular space, a fluid pressure line, a discharge line, pilot controlled check valves and level regulating valves for connecting the spaces with the pressure line or discharge line in dependence on the mean height of the vehicle chassis above the wheel supporting means, the improvement comprising lines between said check valves and said level regulating valves, a hydro-pneumatic pressure reservoir connected to the annular space of each cylinder and the lines between said check valves and said level regulating valves, a control line for said check valves, additional lines for said piston spaces, a relief valve in each additional line opening in the direction of the piston space, and a single multi-way valve with which said pressure line, discharge line, control line and additional lines communicate operative in a first switching position to connect said control line with said pressure line and said additional lines with said discharge, and in a second switching position, the control line with the discharge and the additional lines with the pressure line.

References Cited

UNITED STATES PATENTS 3,191,954   6/1965   Schuetz _____ 280—64

PHILIP GOODMAN, Primary Examiner

U.S. Cl. X.R.

280—124